United States Patent
Van Heerden et al.

(10) Patent No.: US 9,506,586 B2
(45) Date of Patent: Nov. 29, 2016

(54) PIPE CONNECTION GUIDE ARRANGEMENT

(71) Applicants: Garry Ray Van Heerden, Green Point (ZA); Ian Tyndale-Biscoe, Sunvalley (ZA)

(72) Inventors: Garry Ray Van Heerden, Green Point (ZA); Ian Tyndale-Biscoe, Sunvalley (ZA)

( * ) Notice: Subject to any disclaimer, the term of this patent is extended or adjusted under 35 U.S.C. 154(b) by 84 days.

(21) Appl. No.: 14/405,892

(22) PCT Filed: Nov. 21, 2012

(86) PCT No.: PCT/IB2012/056586
§ 371 (c)(1),
(2) Date: Dec. 5, 2014

(87) PCT Pub. No.: WO2013/182875
PCT Pub. Date: Dec. 12, 2013

(65) Prior Publication Data
US 2015/0147152 A1    May 28, 2015

(30) Foreign Application Priority Data

Jun. 6, 2012   (ZA) ................................ 2012/04120

(51) Int. Cl.
*F16L 1/26* (2006.01)
*F16L 23/00* (2006.01)
*F16L 1/20* (2006.01)
*F16L 1/235* (2006.01)

(52) U.S. Cl.
CPC ................ *F16L 23/003* (2013.01); *F16L 1/20* (2013.01); *F16L 1/235* (2013.01); *F16L 1/26* (2013.01)

(58) Field of Classification Search
CPC ............. F16L 1/12; F16L 1/20; F16L 1/235; F16L 1/26; F16L 23/003; F16L 1/161; F16L 23/006; F16L 23/02; F16L 55/18; B21D 39/046; E21B 17/02; E21B 17/085; Y10T 29/53778

See application file for complete search history.

(56) References Cited

U.S. PATENT DOCUMENTS 3,015,883 A * 1/1962 Brown ...................... F16L 1/10
                                                   29/271
3,036,372 A * 5/1962 Vigneron .................. F16L 1/09
                                                   254/29 R (Continued)

FOREIGN PATENT DOCUMENTS

DE           2802535         8/1978
WO      WO 8606147 A1 * 10/1986 ................ F16L 1/26

OTHER PUBLICATIONS

International Search Report For PCT/IB2012/056586 dated Feb. 6, 2013.

*Primary Examiner* — Beth Stephan
(74) *Attorney, Agent, or Firm* — Stephen J. Weyer, Esq.; Stites & Harbison, PLLC

(57) ABSTRACT

A pipe connection guide arrangement is adapted to align a first pipe section having a first flange with a second pipe section having a second flange. The arrangement includes a guide bar to be attached to the first pipe section in a manner in which the guide bar projects longitudinally beyond the first flange. Similarly, a guide funnel is to be attached to a second pipe section, wherein the guide funnel is adapted to receive and locate the guide bar to laterally align the first pipe section to the second pipe section. A stopper bar is provided on the guide bar forward of the first flange, wherein the stopper bar is adapted to abut against the guide funnel to longitudinally align the first pipe section.

19 Claims, 6 Drawing Sheets

(56) References Cited

U.S. PATENT DOCUMENTS

| | | | |
|---|---|---|---|
| 3,267,682 A * | 8/1966 | Robley | F16L 1/161 405/170 |
| 3,561,615 A * | 2/1971 | Forsberg | F16L 1/09 29/237 |
| 3,657,786 A * | 4/1972 | Wiswell, Jr. | F16L 1/09 29/237 |
| 3,658,231 A * | 4/1972 | Gilman | F16L 1/26 228/44.5 |
| 3,952,936 A * | 4/1976 | Dearman | F16L 13/02 228/49.3 |
| 4,039,087 A * | 8/1977 | Sandvick, Sr. | F16L 1/09 254/29 R |
| 4,076,130 A * | 2/1978 | Sumner | B23K 9/0061 29/781 |
| 4,195,828 A * | 4/1980 | Peterson | B23K 37/0533 228/49.3 |
| 4,197,033 A * | 4/1980 | Gendron | F16L 1/20 405/170 |
| 4,229,120 A * | 10/1980 | Wallace | F16L 1/26 405/158 |
| 4,268,190 A * | 5/1981 | Tesson | F16L 1/26 405/169 |
| 4,513,955 A * | 4/1985 | Daubon | B23K 37/0435 269/155 |
| 4,640,531 A | 2/1987 | Forster et al. | |
| 4,769,889 A * | 9/1988 | Landman | B25B 27/10 269/43 |
| 4,832,530 A | 5/1989 | Andersen et al. | |
| 5,094,435 A * | 3/1992 | Depperman | B23K 37/0536 269/43 |
| 5,118,024 A * | 6/1992 | McClure | B23K 37/0533 228/44.5 |
| 5,228,181 A * | 7/1993 | Ingle | B25B 27/16 228/44.5 |
| 5,560,091 A * | 10/1996 | Labit, Jr. | B25B 27/16 269/43 |
| 5,662,432 A * | 9/1997 | Colter | F16L 1/06 405/154.1 |
| 6,234,717 B1 * | 5/2001 | Corbetta | E21B 41/04 405/158 |
| 7,036,202 B2 * | 5/2006 | Lorenz | E21B 19/155 166/77.51 |
| 7,402,000 B2 * | 7/2008 | Bastesen | E21B 43/0107 166/342 |
| 8,052,351 B2 | 11/2011 | Bird | |
| 2001/0003225 A1 * | 6/2001 | Stephen | F16L 1/10 29/272 |
| 2008/0205990 A1 | 8/2008 | Bird | |
| 2013/0067709 A1 * | 3/2013 | Bender | B25B 5/147 29/272 |

\* cited by examiner

PIPE CONNECTION GUIDE ARRANGEMENT

FIELD OF INVENTION

The present invention relates to a pipe connection guide arrangement.

More particularly, the present invention relates to a pipe connection guide arrangement for joining of pipe sections by connection of spool pieces.

BACKGROUND TO INVENTION

When laying an offshore underwater pipeline there is a limit on how close the pipeline can be terminated to its desired target, such as an oil well. One reason is that oilrig platforms obstruct the travel of a pipe laying barge and prevent it from laying the pipeline all the way up to the oil well. Therefore the pipeline end terminates a distance from the oil well terminal and needs to be joined thereto by installing a spool piece. The term "spool piece" refers to a prefabricated section that includes the pipe, fittings and flanges that are pre-assembled on the surface and then transported to the field for insertion between the pipeline end and the oil well terminal.

Invariably divers are required to install the spool pieces underwater while working either at great depths in saturation diving systems or in shallower depths as air divers. Due to seabed sediment being disturbed by movement of the spool piece during installation, there is often zero visibility at the installation location, which makes the installation process more difficult and dangerous.

Current methods of installing a spool piece include the use of a barge or dynamically positioned crane to lower the spool piece along with lift bags, camel bags and DMA's (Dead Man Anchors) allowing manoeuvring of the spool piece into the correct position. Alternatively, sleepers or mattresses or "A" frames are utilised, which all require an additional separate installation to be erected and removed from the site after completion of the spool piece installation. These methods are time consuming as the rigging of the lift bags/camel bags require inflation and deflation and de-rigging.

A further problem is encountered due to surface swells in the water, which often cause erratic movement of the supporting crane. This leads to tooling equipment getting jammed between the spool piece and pipeline or being damaged before proper seating in the bolt holes. All these problems delay completion of the job and also form a major hazard to the divers that can result in injury or loss of limbs, possibly even being fatal.

It is an object of the invention to suggest a pipe connection guide arrangement, which will assist in overcoming these problems.

SUMMARY OF INVENTION

According to the invention, a pipe connection guide arrangement being adapted to align a first pipe section having a first flange with a second pipe section having a second flange, includes a guide bar being adapted to be attached to the first pipe section, the guide bar projecting longitudinally beyond the first flange;

a guide funnel being adapted to be joined to a second pipe section, the guide funnel further being adapted to receive and locate the guide bar; and a stopper bar provided on the guide bar forward of the first flange, wherein the stopper bar is adapted to abut against the guide funnel.

The pipe connection guide arrangement may be adapted for use in underwater alignment of pipes, particularly for use in positioning a spool piece relative to a pipeline.

The guide bar may be adapted to be attached to the first pipe section so that it rests on the first flange and is orientated to extend axially relative to the first pipe section.

The guide bar may be mounted on a curved base plate being adapted to be releasably secured to the first pipe section.

The guide bar may have a collar wherein the guide bar is adapted to be secured to the first pipe section by bolting the collar to the first flange.

The guide bar may be provided with cargo straps being adapted to secure to the guide bar to the first pipe section.

The guide funnel may include two spaced apart cantilever beams arranged in a "Y"-configuration.

The guide funnel may define a gap between the cantilever beams, wherein the gap is a "V"-shaped channel at the upper part of the "Y"-configuration and an "I"-shaped channel at the lower part of the "Y"-configuration.

The cantilever beams may be supported on a curved base plate being adapted to be releasably secured to the second pipe section.

The cantilever beams may be telescopic.

The cantilever beams may be adapted to extend to a height of approximately 2 ½ meters above the second pipe.

The guide funnel may have a collar wherein the collar is adapted to be bolted to the second flange.

The guide funnel may be provided with cargo straps being adapted to secure to the guide funnel to the second pipe section.

The stopper bar may extend transversely, preferably substantially perpendicularly, relative to the guide bar.

The stopper bar may be longitudinally slidable along the guide bar and has a locking screw for being secured to the guide bar in the desired location.

The guide bar may be further provided with a podger being orientated parallel to the guide bar and being longitudinally slidable along the guide bar.

Also according to the invention, an alignment method for aligning a first pipe section having a first flange with a second pipe section having second flange includes the steps of attaching a guide bar to the first pipe section so that the guide bar projects beyond the first flange, wherein the guide bar abuts against the first flange and is orientated parallel to the first pipe section and aligned axially therewith;

securing a stopper bar to the guide bar at a first predetermined distance forward of the first flange;

attaching a guide funnel to the second pipe section at a second predetermined distance from the second flange, the guide funnel forming a gap being adapted to receive and locate the guide bar;

partially lowering the first pipe section towards the second pipe section so that the guide bar is caught by the guide funnel and directed into the gap to permit lateral alignment of the first pipe section;

longitudinally displacing the first pipe section until the stopper bar abuts against the guide funnel to permit axial alignment of the first pipe section; and fully lowering the first pipe section until the guide bar rests on the second flange to permit height alignment of the first pipe section.

The first predetermined distance may be greater than or equal to the second predetermined distance.

The first predetermined distance may be greater than the second predetermined distance preferably by between 100 mm and 400 mm, more preferably by 300 mm.

BRIEF DESCRIPTION OF DRAWINGS

The invention will now be described by way of example with reference to the accompanying schematic drawings.

In the drawings there is shown in.

DETAILED DESCRIPTION OF DRAWINGS

Figure 1:
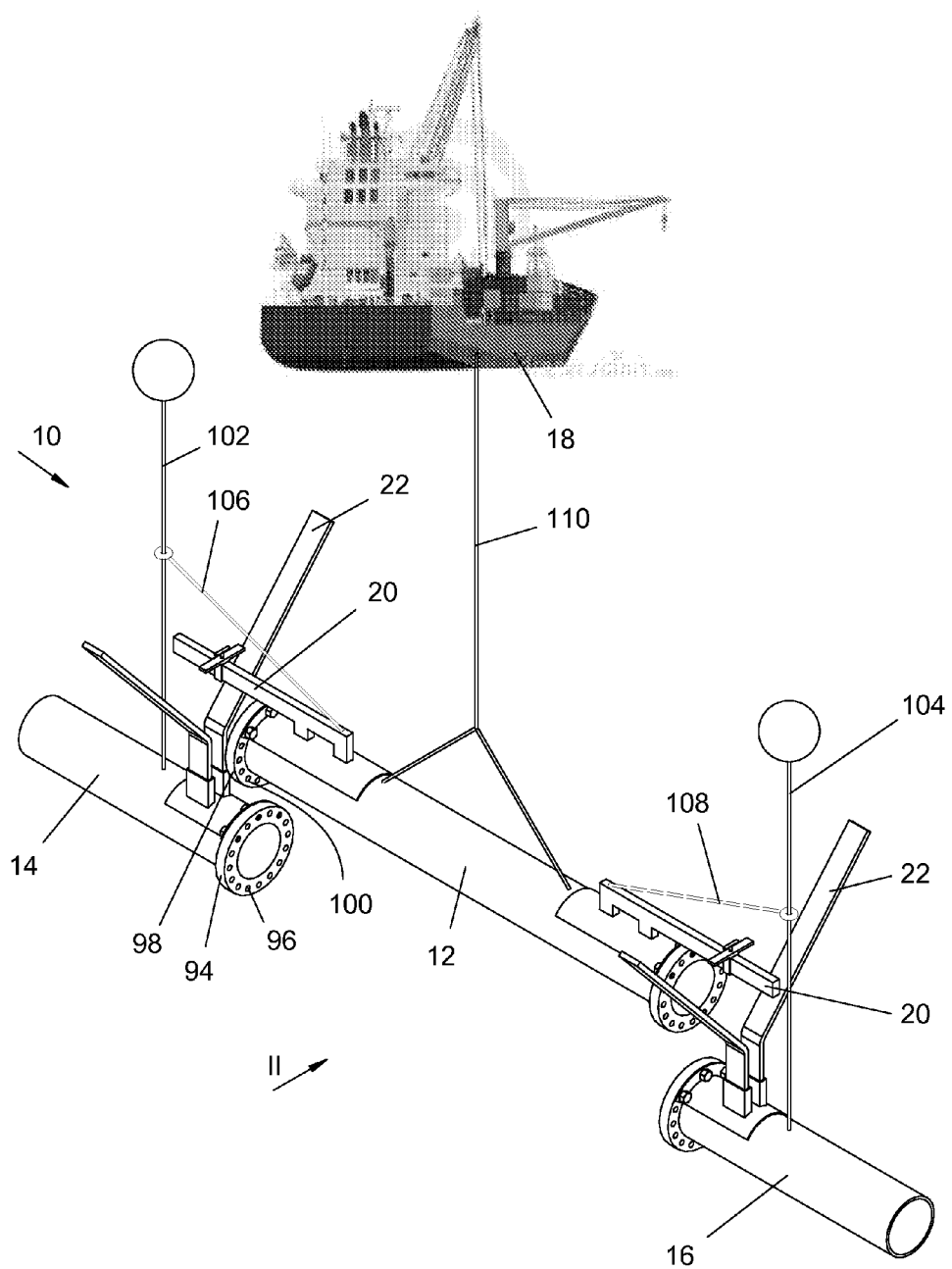
FIG. 1: A perspective view of a pipeline installation provided with a pipe connection guide arrangement according to the invention for locating a spool piece.

A pipe connection guide arrangement in accordance with the invention is shown in FIG. 1 being generally indicated by reference numeral 10. The guide arrangement 10 is adapted for use in the underwater joining of pipes and particularly for accurately positioning a spool piece 12 between a pipeline 14 and a terminal end 16, such as an oil or gas well point (the terminal end 16 can also be another pipeline 14). The spool piece 12 is lowered by a crane from a pipe laying barge 18.

The guide arrangement 10 is provided in two parts and includes a guide bar 20 and a guide funnel or yoke 22, wherein the guide funnel 22 is adapted to receive and locate the guide bar 20.

Figure 3:
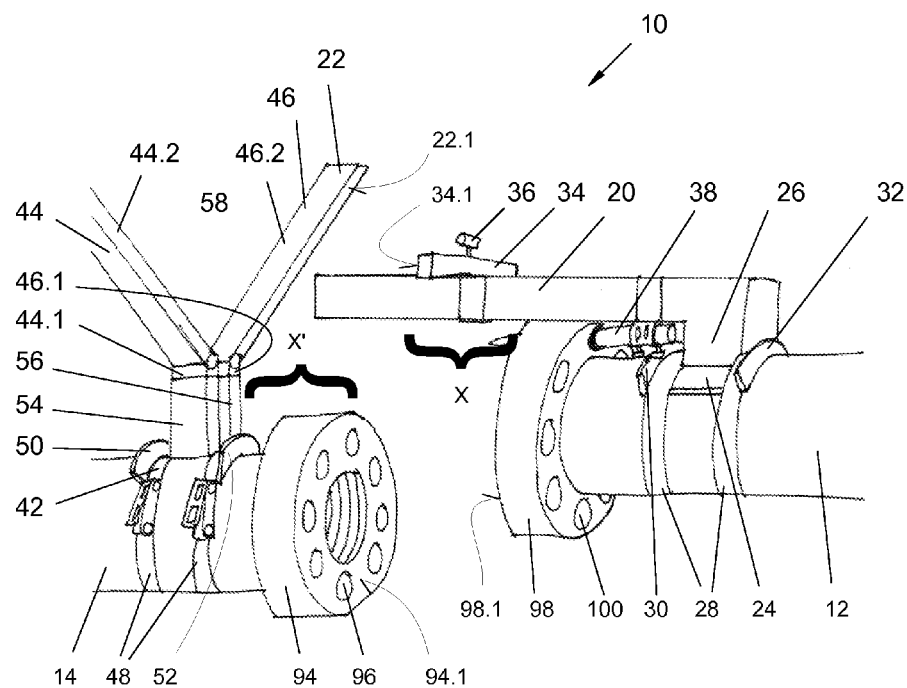
FIG. 3: An enlarged scale perspective view of a first embodiment of the pipeline installation showing one connecting end between the spool piece and pipeline.
Figure 4:
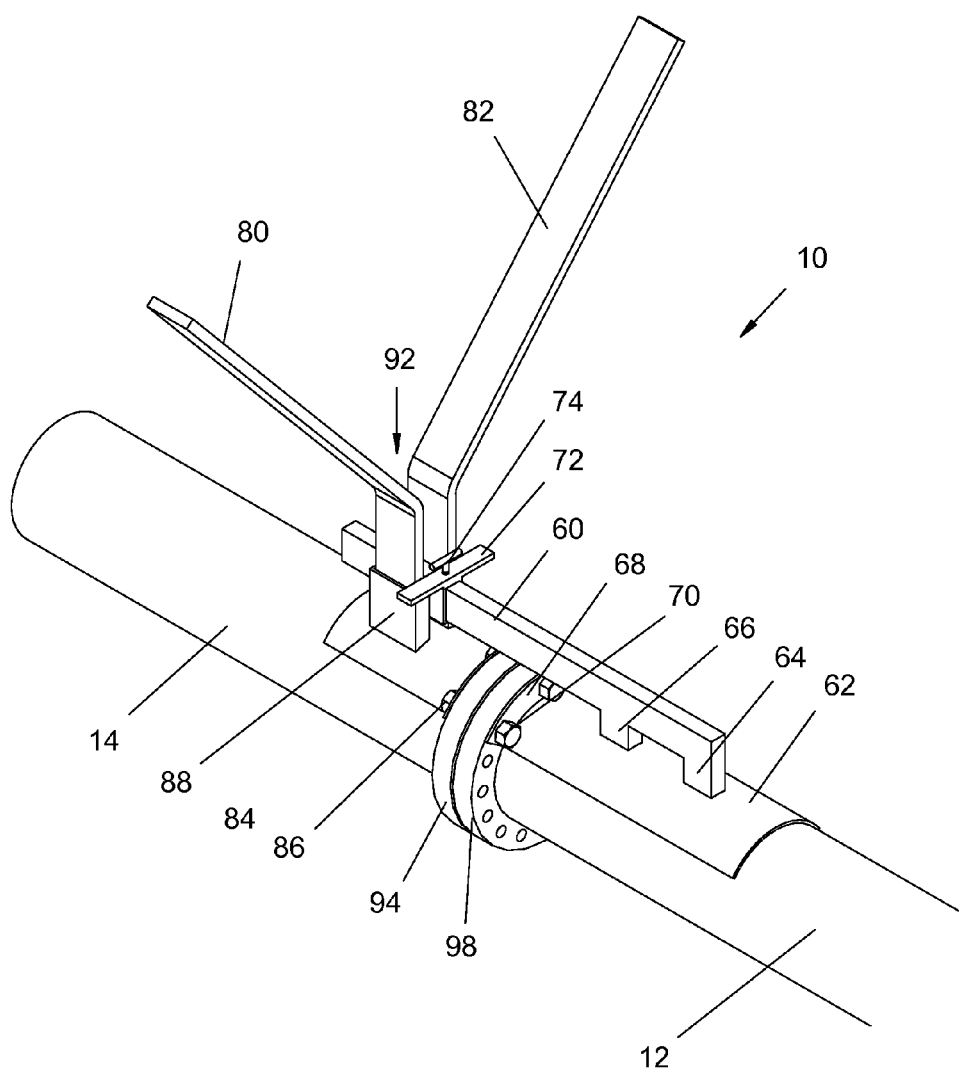
FIG. 4: An enlarged scale perspective view of a second embodiment of the pipeline installation showing one connecting end between the spool piece and pipeline.
Figure 5:
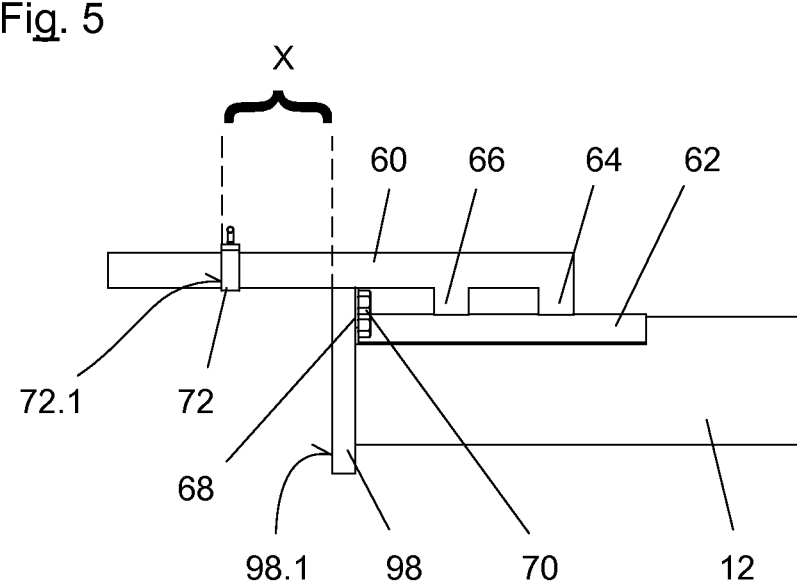
FIG. 5: A side view of an end of the spool piece shown in FIG. 4.
Figure 6:
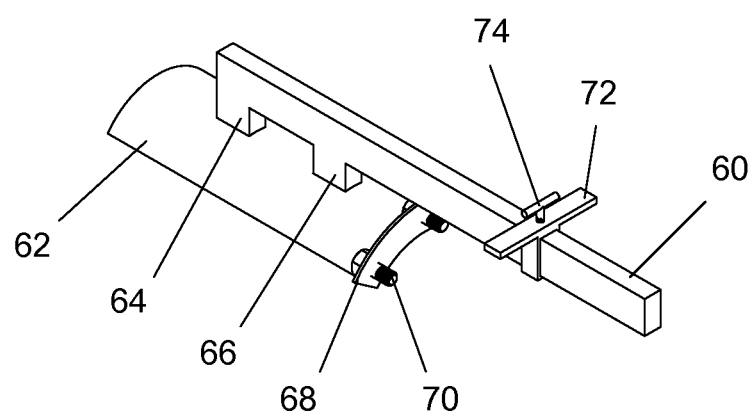
FIG. 6: A perspective view the spool piece end shown in FIG. 5.
Figure 7:
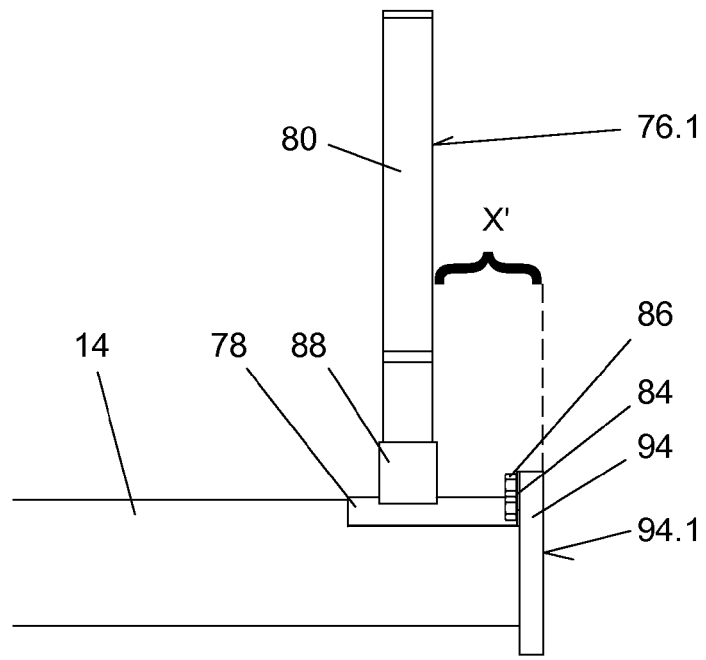
FIG. 7: A side view of an end of the pipeline shown in FIG. 4.
Figure 8:
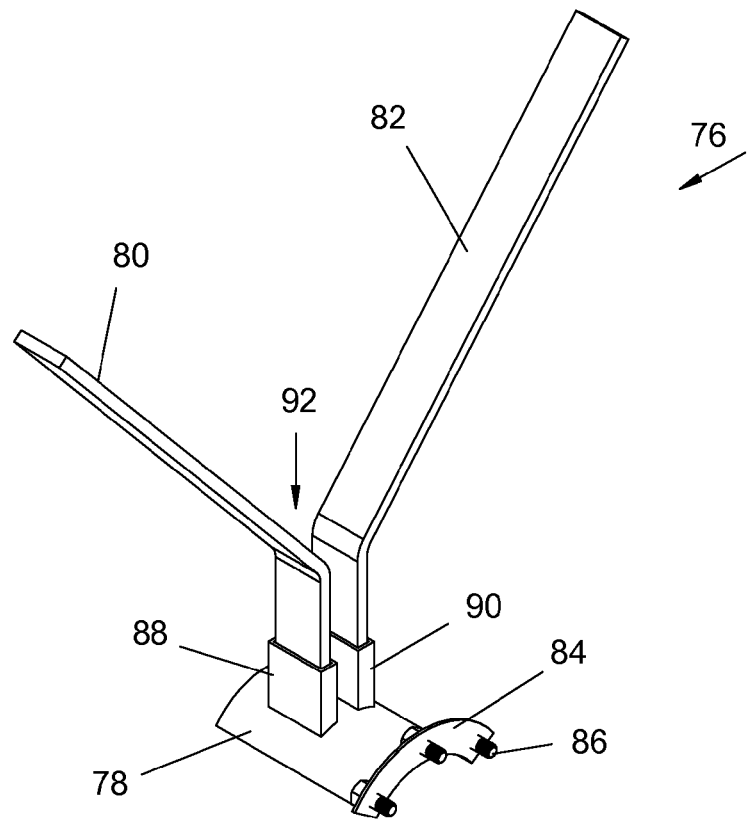
FIG. 8: A perspective view the pipeline end shown in FIG. 7

In a first embodiment of the guide arrangement 10, as shown in FIG. 3, the guide bar 20 is mounted on a curved base plate 24 via a neck 26, with the base plate 24 being adapted to be releasably secured to the spool piece 12 by cargo straps 28. The base plate 24 is provided with two opposite arcuate collars 30, 32 extending radially outwards from the base plate 24. These collars 30, 32 improve the structural rigidity of the base plate 24 to avoid flexing thereof under external forces applied to the guide bar 20. The base plate 24 has various adjustment means, e.g. such as adjustment screws (not being shown), being adapted to adjust the spacing and/or curvature of the base plate 24 for use on differently diameter pipes.

The guide bar 20 is provided with a transverse stopper bar 34, which extends substantially perpendicularly relative to the guide bar 20. The stopper bar 34 is longitudinally slidable along the guide bar 20 and has a locking screw 36 for securing it in the desired location. The stopper bar 34 is provided on the operative upper side of the guide bar 20.

The guide bar 20 is further provided with a podger 38 or drift pin, which is substantially longitudinally aligned parallel to the guide bar 20. The podger 38 is longitudinally slidable along the guide bar 20 and is provided on the operative lower side of the guide bar 20. The podger 38 is further laterally adjustable so that it can be spaced further away from or closer to the guide bar 20, to make allowance for differently spaced bolt holes in a pipe flange.

The guide funnel 22 includes a curved base plate 42 supporting two cantilever beams 44, 46. The base plate 42 is adapted to be releasably secured to the pipeline 14 or terminal end 16 by cargo straps 48, with the base plate 42 being provided with two opposite arcuate collars 50, 52 extending radially outwards from the base plate 42. The collars 50, 52 improve the structural rigidity of the base plate 42 to avoid flexing thereof under external forces applied to the cantilever beams 44, 46.

The cantilever beams 44, 46 seen together form a Y-shaped funnel wherein the cantilever beam 44 has a first leg 44.1 and a second leg 44.2 and, similarly, the cantilever beam 46 has a first leg 46.1 and a second leg 46.2. The first legs 44.1, 46.1 are partially housed in outer sheaths 54, 56 that are joined to the base plate 42. The sheaths 54, 56 are arranged substantially parallel to each other and are spaced apart by a distance being slightly larger than the width of the guide bar 20, thereby forming a gap 58 into which the guide bar 20 can be located. The free second legs 44.2, 46.2 diverge from each other to form a funnel or "V" channel leading into the gap 58. The cantilever beams 44, 46 can be telescopic and preferably are sized to extend up to a height of approximately 2 ½ meters above the base plate 44. The cantilever beams 44, 46 may optionally each have a hinge connection at the junction of their first legs 44.1, 44.1 and second legs 46.2, 46.2.

The cargo straps 28, 48 should preferably have a carrying strength of 5 ton.

In a second embodiment of the guide arrangement 10 as illustrated in FIGS. 4 to 8 of the drawings, the guide bar 60 is mounted on a curved base plate 62 via dual spaced apart necks 64, 66 to provide additional rigidity for the guide bar 60. The base plate 62 is provided with an arcuate collar 68 at its end located beneath the guide bar 60 with the collar 68 extending radially outwards from the base plate 62. The collar 68 improves the structural rigidity of the base plate 62 to avoid flexing thereof under external forces applied to the guide bar 60. The collar 68 is also provided with bolts 70 and bolt holes for attachment of the base plate 62 to a pipeline flange.

The guide bar 60 is provided with a transverse stopper bar 72, which extends substantially perpendicularly relative to the guide bar 60. The stopper bar 72 is longitudinally slidable along the guide bar 60 and has a locking screw 74 for securing it in the desired location. The stopper bar 72 is provided on the operative upper side of the guide bar 60.

The guide funnel 76 includes a curved base plate 78 supporting two cantilever beams 80, 82. The base plate 78 is provided with an arcuate collar 84 that extends radially outwards from the base plate 78. The collar 84 improves the structural rigidity of the base plate 78 to avoid flexing thereof under external forces applied to the cantilever beams 80, 82. The collar 84 is also provided with bolts 86 and bolt holes for attachment of the base plate 78 to a pipeline flange.

The cantilever beams 80, 82 cooperate to form a Y-shaped funnel seen in end view. The cantilever beams 80, 82 are respectively partially housed in outer sheaths 88, 90 joined to the base plate 78. The sheaths 88, 90 are spaced apart by a distance being slightly larger than the width of the guide bar 60, thereby forming a gap 92 into which the guide bar 60 can be located. The funnel shape of the cantilever beams 80, 82 forms a converging channel leading into the gap 92. The cantilever beams 80, 82 can be telescopic and preferably are sized to extend up to a height of approximately 2 ½ meters above the base plate 78. The cantilever beams 80, 82 may optionally be adjustable to enable the funnel shape to be altered.

The collars 68, 84 are preferably adapted to be bolted to the pipeline flanges at the 10 o'clock, 12 o'clock and 2 o'clock positions.

The guide arrangement 10 is preferably manufactured of stainless steel, resulting in non-corrosive and very strong item of equipment.

Figure 2:
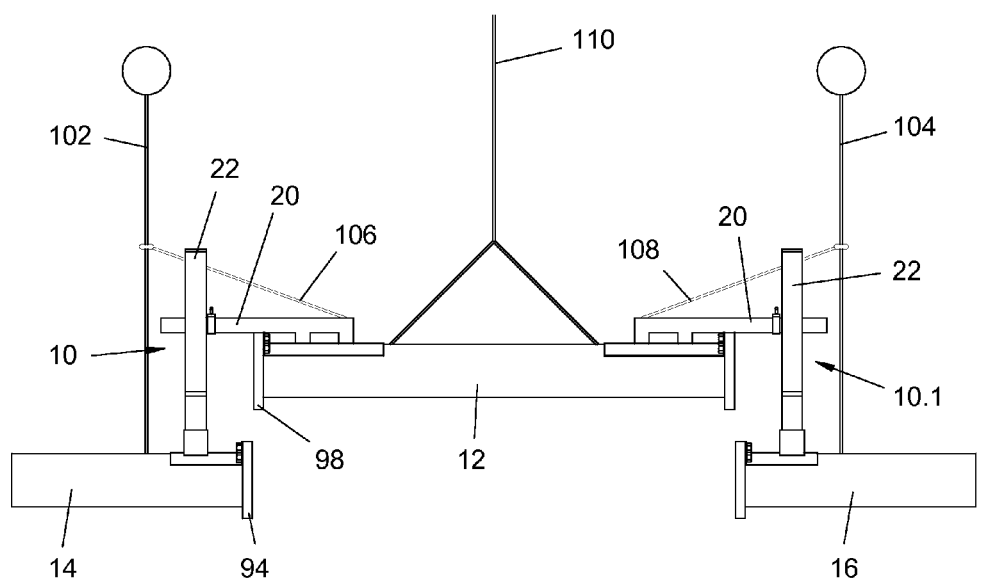
FIG. 2: A side view of the pipeline installation of FIG. 1 seen along arrow II in FIG. 1.

The operational use of the guide arrangement 10 is illustrated in FIGS. 1 and 2 showing the spool piece 12 being lowered and located between the pipeline 14 and the terminal end 16. Enlarged views of one end of the spool piece 12 are shown in FIG. 3 (illustrating the use of the first embodiment) and in FIG. 4 (illustrating the use of the second embodiment). Due to the substantial similarity between the first and second embodiments, similar reference numerals will be used where appropriate, particularly when referring to parts of the pipelines.

The end of the pipeline 14 has a pipe flange 94 in which a number of bolt holes 96 are provided. Similarly, the spool piece 12 has a spool flange 98 at its end with a number of bolt holes 100 are provided therein. The pipe flange 94 and spool flange 98 correspond to each other so they can be aligned with each other and joined together by inserting bolts through their respective bolt holes 96, 100.

The guide bar 20, 60 is pre-fitted to the spool piece 12 while still on deck of the pipe laying barge 18. This is done by either by locating the base plate 24 against the outer surface of the spool piece 12 and securing it thereto with the cargo straps 28 or by locating the base plate 62 against the outer surface of the spool piece 12 and securing the collar 68 to the flange 100. The guide bar 20, 60 is longitudinally aligned on the spool piece 12 and positioned to extend forward beyond the spool flange 98 and to rest thereon.

The stopper bar 34, 72 is fixed to the guide bar 20, 60 at a predetermined distance "X" forward of the spool flange 98, wherein "X" is the distance from the front face 34.1, 72.1 of the stopper bar 34, 72 to the front face 98.1 of the spool flange 98.

In the first embodiment (FIG. 3), the podger 38 is initially positioned between the spool flange 98 and the neck 26 so that it does not project beyond the front face 98.1 of the spool flange 98.

The installation of the funnel 22, 76 will be done either on the pipe laying barge 18 or underwater. If the pipeline 14 is in the process of being laid, then the funnel 22, 76 is attached to the pipeline 14 while on deck. This is preferable as it enables the funnel 22 to be accurately positioned on the pipeline 14. Alternatively, if the pipeline 14 has already been laid, a diver will need to install the funnel 22 underwater before lowering the spool piece 12.

In the first embodiment (FIG. 3), the funnel 22 is installed by locating the base plate 44 against the outer surface of the pipeline 14 and securing it thereto with the cargo straps 50. The funnel 22 is positioned a fixed distance "X" away from the pipe flange 94, wherein "X" is the distance from the front face 22.1 of the funnel 22 to the front face 94.1 of the pipe flange 94.

In the second embodiment (FIG. 4), the funnel 76 is installed by locating the base plate 78 against the outer surface of the pipeline 14 and securing the collar 84 to the pipe flange 94. The integral form of the base plate 78 and collar 84 automatically positions the funnel 76 at the correct distance "X" away from the front face 94.1 of the pipe flange 94.

The distance X is greater than or equal to the distance X' (i.e. X X'), wherein preferably the difference between X and X' (i.e. X-X') varies from 100 mm to 400 mm, and wherein more preferably the difference is 300 mm.

A second guide arrangement 10.1 is similarly attached to the opposite end of the spool piece 12 for connection to the terminal end 16. The operation thereof is identical to that of the first guide arrangement 10 and thus will not be further described in detail. However, preferably the stopper bar 34 will be removed from the guide bar 20, 60 of the second guide arrangement 10.1.

A first vertically extending drop line 102 is joined to the pipeline 14 remote form the pipe flange 94, while a second drop line 104 is joined to the terminal end 16. Guide lines 106 and 108 are then respectively fixed to the opposite guide bars 20, 60 and slidably provided on the drop lines 102, 104. As the spool piece 12 is lowered by rigging 110, the guide lines 106, 108 keep the spool piece 12 roughly orientated in the desired position and alignment.

When the spool piece 12 nears its insertion position, the guide bar 20, 60 is caught in the funnel 22 between the divergent cantilever beams 46, 48 or 80, 82 and subsequently guided into and trapped in the gap 58, 92 to ensure the spool piece 12 is properly laterally aligned with the pipeline 14. The spool piece 12 is then moved longitudinally closer towards the pipeline 14 until the stopper bar 34, 72 abuts against the funnel 22, 76 to ensure the spool piece 12 is properly axially aligned with the pipeline 14. Lastly, the spool piece 12 is fully lowered, at which stage the guide bar 20, 60 rests on top of the pipe flange 94 to ensure the spool piece 12 is at the proper height and aligned with the pipeline 14.

A diver thus merely needs to rotate the spool flange 98 using a flange rotating bar until the bolt holes 96 align with the bolt holes 100 and the necessary bolts fixed in place to join the flanges 94, 98 together. Optionally the podger 38 to be inserted through a pair of bolt holes to prevent undesired rotation between the flanges 94, 98.

Provided the spool piece 12 has been accurately designed (angle and length), the correct alignment thereof with respect to the pipeline 14 will result in the automatic correct alignment of its other end with the terminal end 16.

Once the spool piece 12 is securely joined to the pipeline 14, the guide arrangements 10 and 10.1 can be easily removed. Advantageously, the freedom of adjustment of the cargo straps 28, 48 allow use of the guide arrangement 10 on different diameter spool pieces 12.

The advantage of the guide arrangement 10 is that the spool piece 12 is easily and accurately located and thus requires minimal crane movements by the barge 18. This frees up deck space for other uses. Also, the more accurate alignment results in reduced flange face damage. Furthermore, due to the cantilever beams extending are about 2 meters above the pipeline 14, there is a greater possibility of increased visibility above the disturbed sediment.

The invention claimed is:

1. A pipe connection guide arrangement being adapted to align a first pipe section having a first flange with a second pipe section having a second flange, the arrangement comprising:
    a guide bar being adapted to be attached to the first pipe section, the guide bar adapted to project longitudinally beyond the first flange;

a guide funnel being adapted to be joined to a second pipe section, the guide funnel further being adapted to receive and locate the guide bar; and a stopper bar for placement forward of the first flange, the stopper bar being longitudinally slidable along the guide bar and having a locking screw for being secured to the guide bar in a desired location, wherein the stopper bar is adapted to abut against the guide funnel.

2. The pipe connection guide arrangement as claimed in claim 1, which is configured for accommodating underwater alignment of pipes.

3. The pipe connection guide arrangement as claimed in claim 1, in which the guide bar is configured for attachment to the first pipe section so that the guide bar rests on the first flange and is orientated to extend axially relative to the first pipe section.

4. The pipe connection guide arrangement as claimed in claim 1, in which the guide bar is mounted on a curved base plate being adapted to be releasably secured to the first pipe section.

5. The pipe connection guide arrangement as claimed in claim 1, in which the guide bar has a collar, and wherein the guide bar is adapted to be secured to the first pipe section by bolting the collar to the first flange.

6. The pipe connection guide arrangement as claimed in claim 1, in which the guide bar is provided with cargo straps being adapted to secure to the guide bar to the first pipe section.

7. The pipe connection guide arrangement as claimed in claim 1, in which the guide funnel includes two spaced apart cantilever beams arranged in a "Y"-configuration.

8. The pipe connection guide arrangement as claimed in claim 7, in which the guide funnel defines a gap between the cantilever beams, wherein the gap is a "V"-shaped channel at the upper part of the "Y"-configuration and an "I"-shaped channel at the lower part of the "Y"-configuration.

9. The pipe connection guide arrangement as claimed in claim 7, in which the cantilever beams are supported on a curved base plate being adapted to be releasably secured to the second pipe section.

10. The pipe connection guide arrangement as claimed in claim 7, in which the cantilever beams are telescopic.

11. The pipe connection guide arrangement as claimed in claim 7, in which the cantilever beams are adapted to extend to a height of approximately 2.5 meters above the second pipe.

12. The pipe connection guide arrangement as claimed in claim 7, in which the guide funnel has a collar, wherein the collar is adapted to be bolted to the second flange.

13. The pipe connection guide arrangement as claimed in claim 7, in which the guide funnel is provided with cargo straps being adapted to secure to the guide funnel to the second pipe section.

14. The pipe connection guide arrangement as claimed in claim 1, in which the stopper bar extends transversely relative to the guide bar.

15. The pipe connection guide arrangement as claimed in claim 1, in which the guide bar is further provided with a podger being orientated parallel to the guide bar and being longitudinally slidable along the guide bar.

16. An alignment method for aligning a first pipe section having a first flange with a second pipe section having a second flange includes the steps of:

attaching a guide bar to the first pipe section so that the guide bar projects beyond the first flange, wherein the guide bar abuts against the first flange and is orientated parallel to the first pipe section and aligned axially therewith;

securing a stopper bar to the guide bar at a first predetermined distance forward of the first flange, the stopper bar being longitudinally slidable along the guide bar and having a locking screw for being secured to the guide bar in a desired location;

attaching a guide funnel to the second pipe section at a second predetermined distance from the second flange, the guide funnel forming a gap being adapted to receive and locate the guide bar;

partially lowering the first pipe section towards the second pipe section so that the guide bar is caught by the guide funnel and directed into the gap to permit lateral alignment of the first pipe section;

longitudinally displacing the first pipe section until the stopper bar abuts against the guide funnel to permit axial alignment of the first pipe section; and fully lowering the first pipe section until the guide bar rests on the second flange to permit height alignment of the first pipe section.

17. The alignment method as claimed in claim 16, in which the first predetermined distance is greater than or equal to the second predetermined distance.

18. The alignment method as claimed in claim 16, in which the first predetermined distance is greater than the second predetermined distance by between 100 mm and 400 mm.

19. The alignment method as claimed in claim 18, in which the first predetermined distance is greater than the second predetermined distance by 300 mm.

* * * * *